United States Patent [19]

Eriksson et al.

[11] 4,454,013

[45] Jun. 12, 1984

[54] METHOD OF SEPARATING IRON AND ITS ALLOY METALS FROM FINE-GRAINED CRUDE OXIDIC PRODUCTS

[75] Inventors: Sune Eriksson, Hofors; Gotthard Björling, Djursholm, both of Sweden

[73] Assignee: SKF Steel Engineering AB, Sweden

[21] Appl. No.: 496,813

[22] Filed: May 23, 1983

[30] Foreign Application Priority Data

May 28, 1982 [SE] Sweden ................................ 8203320

[51] Int. Cl.³ .............................................. C25C 1/06
[52] U.S. Cl. ......................................... 204/112; 75/21; 75/26; 75/29; 75/30; 75/59; 75/65 R
[58] Field of Search ....................... 204/112; 75/21, 26, 75/29, 30, 59, 52, 65 R, 89

[56] References Cited

U.S. PATENT DOCUMENTS

| | | | |
|---|---|---|---|
| 3,856,918 | 12/1974 | Skrivan et al. ........................... | 75/29 |
| 3,967,954 | 7/1977 | Chen ........................................ | 75/21 |
| 4,047,934 | 9/1977 | Pollard et al. ........................... | 75/29 |
| 4,234,333 | 11/1980 | Ghandehari et al. ................. | 204/112 |

OTHER PUBLICATIONS

Periodic Table of the Elements, E. H. Sargent & Co.

*Primary Examiner*—R. L. Andrews
*Attorney, Agent, or Firm*—Brumbaugh, Graves, Donohue & Raymond

[57] ABSTRACT

Pure ferro-alloy metals are isolated from fine-grained crude oxidic mineral products by reduction melting and subsequent anodic liberation of the iron. The reduction melting is performed in a plasma-heated furnace into which the fine-grained oxide material is blown together with carbon powder and circulating exhaust gas, extremely over-heated in a plasma generator, the quantity of carbon powder being dosed so that most of the alloy metal(s) is converted to carbides during the reduction. After electrolysis, the anode residue will consist primarily of alloy metal carbides from which the metal can be recovered by known methods.

8 Claims, 1 Drawing Figure

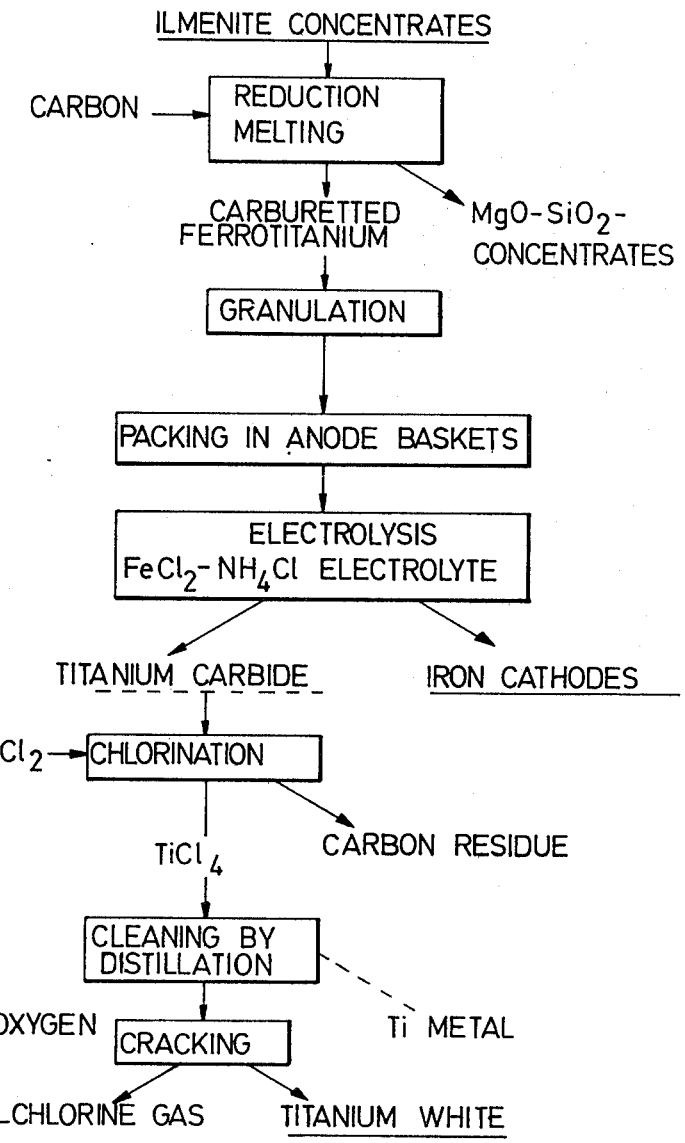

METHOD OF SEPARATING IRON AND ITS ALLOY METALS FROM FINE-GRAINED CRUDE OXIDIC PRODUCTS

The invention relates to a method of separating iron and one or more ferro-alloy metals from fine-grained crude oxidic mineral products by means of reduction melting, to produce a ferro-alloy for use as anode material in the electrolytic liberation of the iron content therein and precipitation of pure iron on the cathodes, at the same time forming an anode residue constituting a concentrate of the alloy metal or metals.

Ferro-alloy metals exist primarily within groups IV a, V a and VI a of the periodic system. They often occur in oxidic mineral together with iron oxides and cannot be separated from the iron by mechanical enriching. Examples of such oxidic minerals are ilmenite $FeO \cdot TiO_2$, niobite $FeO \cdot Nb_2O_5$ and chromite $FeO \cdot Cr_2O_3$.

Starting with oxidic mineral of the type mentioned above, for instance, the corresponding ferro-ally, that is ferro-titanium, ferro-niobite and ferro-chromium in the above cases, can be produced by means of reduction melting. Since the alloy metals in the above groups are all less noble than iron they cannot be produced in pure form by removing the iron through de-slagging.

Neither does anodic liberation of the iron offer any solution. Although the alloy metals are attacked before the iron, they cannot form soluble salts in neutral water solution, but will be converted to a fine hydroxide slurry forming a suspension not prone to sedimentation. The suspension particles are thus combined with and contaminate the cathode iron. An electro-chemical unbalance also occurs since both iron and alloy metal are oxidized at the anode whereas only iron is precipitated on the cathode. This is not compatible with Faraday's law.

Instead, the object is production of a ferro-alloy for use as anode material in the electrolytic liberation of iron to form an anode residue which is substantially free from iron.

By binding the alloy metals as carbides in the reduction process, i.e. by producing a carburetted alloy, more favourable conditions are created for the electrolytic precipitation of iron. All the alloy metals have a greater affinity to carbon than iron does, and carbon in the melt will therefore be bound to them by preference. When the melt solidifies, carbides, which generally have high melting points, are separated out and form separate crystals in the iron matrix. Upon anodic liberation of such an alloy, the carbide crystals are exposed without being oxidized and, at moderate contents, they form an anode residue consisting of a coherent skeleton structure which gives rise to very little current resistance. Since electro-chemical balance now reigns, i.e. the only anode reaction is liberation of iron and the only cathode reaction is precipitation of iron, the electrolysis can continue until practically all the iron has been liberated.

At the time of the present invention reduction melting is normally carried out in electric arc furnaces. Fine-grained starting material cannot be used for this and must first be agglomerated by pelletization, for instance. The oxide materials in question here, however, have extremely high melting points and some are even used as refractory material. Agglomeration is thus an exremely complicated and expensive process which should preferably be avoided.

The present invention is designed to produce pure ferro-alloy metals from fine-grained oxidic starting material by a process in which the above drawbacks are subtantially eliminated.

This is achieved, according to the present invention, by a procedure in which the reduction melting process is performed in a plasma-heated furnace into which the fine-grained oxide material is blown together with carbon powder and circulating exhaust gas extremely over-heated in a plasma generator, the quantity of carbon powder being dosed so that a substantial proportion of the alloy metal(s) is converted into carbides during the reduction process and the anode residue formed after electrolytsis consists primarily of alloy metal carbides from which the pure alloy metal(s) can be recovered by methods known per se, e.g. direct chlorination.

The invention thus makes it unnecessary to use coke. Coal dust works excellently. The circulating exhaust, consisting primarily of carbon monoxide, is preferably given a heat content of 4–6 $kWh/Nm^3$ when heated in the plasma-generator, thus enabling the strongly endothermic reduction and carbide-forming reactions to proceed.

According to one embodiment of the invention, nitrogen gas, also heated in th plasma generator, is blown into the furnace together with the circulating exhaust gas, whereupon a ferro-alloy is formed containing a mixture of carbides and nitrides of the alloy metals. This mixture is then included in the anode residue formed during the electrolytic treatement.

As a rule, the alloy metals have a greater affinity to nitrogen than iron does and the carbo-nitrides, i.e. the mixture of carbides and nitrides, behave in the same way as the carbides. For certain metals such as zirconium, carbo-nitridation gives a better yield than just carbide formation. The amount of carbon powder should be sufficient for substantially all of the alloy metal(s) to be converted, to carbide when nitrogen is not used or to carbide/nitride when nitrogen is also used. In other words, there should be more than 50% by weight conversion of alloy metal(s) and preferably at least 90% by weight conversion.

The reduction melting process itself can be performed in various ways. According to one embodiment of the invention, the oxide-containing starting material and the carbonaceous reducing agent are blown into the reaction chamber which is continuously produced in a shaft filled with coke due to the action of the gases heated in the plasma generator, the reaction taking place in said reaction chamber and melts of carburetted ferro-alloy and slag formed are caused to flow down to the bottom of the shaft to be tapped off and separated. This method gives high carburization from the coke column.

According to another embodiment of the invention, the plasma-heated gases, the oxide-containing material and the carbonaceous reducing agent are blown in under the surface of the slag bed, whereupon the reactions take place in the gas bubbles formed and carburetted ferro-alloy is separated at the bottom of the slag bed. In this embodiment the carbide formation can be accurately adjusted by controlling the quantity of carbonaceous reducing agent added. Oxide material in chunks may, however, also be added to the surface of the slag bed.

According to yet another embodiment of the invention the plasma-heated gases, the oxide-containing starting material and the carbonaceous reducing material are blown in under the surface of a melt of the ferro-alloy in question, from which slag formed is separated out. This method also leads to high carburization and allows the addition of solid oxide material to the surface of the slag bed.

Further advantages and characteristics of the invention will be evident from the detailed description of a number of applications and an embodiment of the invention by way of drawing which is, with reference to the accompanying example a flowchart for the production of pure titanium according to the invention.

EXAMPLE

The invention will first be described in connection with the production of pure titanium. However, it should be noted that the invention is in no way limited only to the production of titanium but, as indicated above, is particularly suitable for the production of all ferro-alloy metals from groups IV a, V a and VI a.

The most usual titanium mineral is ilmenite, for which the full formula can be written $FeTiO_3$. The carburetted alloy formed in the reduction according to the invention contains carbide TiC, which is extremely stable and has a melting point of ca 3250° C. It is also easy to chlorinate to $TiCl_4$, to which we shall revert later on in the Example.

An ilmenite concentrate having the following analysis is used as oxidic starting material:

| | | |
|---|---|---|
| $TiO_2$ | 45% | |
| FeO | 35% | Fe 35,4% |
| $Fe_2O_3$ | 11,5% | |
| MgO | 4,5% | |
| $SiO_2$ | 2,5% | |
| other oxides | 1,5% | |

The ore concentrate is reduced in a furnace with coke-filled shaft and the necessary energy is supplied by means of a plasma generator. Under the extreme reducing conditions prevailing, about 90% of the titanium content and about 95% of the iron content are reduced out and form carburetted ferro-titanium. The remainder of the oxide content forms a slag. Carbonaceous reducing material is added to the reduction furnace, as well as ore concentrate. Slag containing primarily MgO and $SiO_2$ is removed separately and the carburetted ferro-titanium is removed for further treatment.

Taking 1 ton ilmenite concentrate as a basis for calculation, the material balance shown in the following table is obtained.

TABLE

| Oxide | Concentrate (kg) | Slag (kg) | Slag (%) | Ferro-Carburette (kg) | Ferro-Carburette (%) | Carbide (kg) | Carbide (%) | Iron (kg) | Iron (%) |
|---|---|---|---|---|---|---|---|---|---|
| $TiO_2$ | 450 | 45 | 29.4 | | | | | | |
| $SiO_2$ | 25 | 25 | 16.3 | | | | | | |
| FeO | 350 | 23 | 15.0 | | | | | | |
| $Fe_2O_3$ | 115 | — | — | | | | | | |
| Converted to pure Ti | 270 | 27 | — | — | 243 | 38.0 | 238 | 78.3 | |
| Converted to pure Fe | 354 | 18 | — | — | 336 | 52.5 | 6 | 2.0 | 330 | 99.5 |
| MgO | 45 | 45 | 29.4 | | | | | | |
| Other oxides | 15 | 15 | 9.8 | | | | | | |
| C | — | — | — | 61 | 9.5 | 60 | 19.7 | | |
| Total | 1000 | 153 | | 640 | | 304 | | 330 | |

The carburetted ferro-titanium recovered is granulated and placed in net baskets of an inert material such as titanium. The baskets are placed in cells with an electrolyte suitable for precipitation of the iron, such as $FeCl_2$-$NH_4Cl$ with a concentration of 15 g Fe/l and 135 g $NH_4Cl$/l, the ammonium chloride being present to prevent ferro-hydroxide from being precipitated although the pH value is close to 6. The granules are attacked concentrically, leaving skeleton structured carbides with extremely low iron content. These can be considered to constitute a concentrate, in this case of titanium.

The iron cathodes obtained, often known as "flakes" are used as highly pure scrap iron. Calculated on th same basis as the above, 304 kg of titanium and 330 kg iron are obtained.

Titanium carbide is an extremely favourable starting material for continued treatment. For the production of pure alloy metal, it is often desirable to first form metal chloride, and the titanium carbide is extremely easy to chlorinate, particularly in comparison with the oxide.

The oxides require "reducing chlorination", i.e. heating to 800°–900° C. in briquette form with carbon, whereas carbides react directly with chlorine at about 600° C. Pure metal is then produced from the chloride, by means of metallo-thermic reduction.

As mentioned earlier, the invention is equally suitable for separating iron and producing other pure alloy-metals. by way of examples, below is described the procedure and the advantages of applying the invention to alloy-metals other than titanium. However, the list in no way lays claim to being complete and many other applications of the invention are also feasible.

Zirconium $ZrSiO_4$ is the most usual material containing zirconium. It is extremely advantageous to use the invention for zirconium rich in iron, but not so profitable if the iron content is low. Zirconium easily forms carbonitride. The embodiment with a coke-filled shaft should preferably be used, enabling the removal of most of the silicon content as gaseous SiO.

Steel slags often contain vanadium. With relatively high contents of vanadium, carburetted ferro-vanadium can be reduced directly from the molten slag according to the invention. However, with lower vanadium contents a two-step process is advisable in which a gentle reduction is performed removing so much of the iron content that a vanadium-rich ferro-alloy can be produced in the next step for further treatment according to the invention. Magnetite containing vanadium and other similar materials can also be treated in a similar manner according to the invention.

Niobium and tantalum generally occur in the minerals niobite and tantalite which, besides varying contents of pentoxides of these metals, also contain oxides of iron and manganese. According to conventional methods iron and manganese oxides are liberated in hydrochloric acid, after which the remaining pentoxides must be dissolved in hydrofluoric acid to be converted later to chlorides which are separated in a water solution by liquid extraction in pure niobium chloride and tantalum chloride. The pure metals can finally be produced after hydrolysis to oxides.

According to the present invention carburetted ferro-niobium-ferro-tantulum can be produced immediately, from which a carbide concentrate is produced by anode liberation of iron and manganese. The carbide concentrate can be directly chlorinated and the niobium and tantalum chlorides are separated from the mixture of pentachlorides formed, by means of distillation which, since they are free from water, can easily be converted to the pure metals by means of metallo-thermic reduction.

Tantalum is often present in tin ore and remains after tin has been reduced out in the slag. If such slag is treated in accordance with the invention, carburetted ferro-tantalum can be produced directly from the liquid slag.

Chromium exists almost solely in the form of chromite (Fe, Mg) $O.CR_2O_3$. Pure chromium is produced by a conventional method according to which a type of carburetted ferro-chromium is produced by reduction of piece ore or pellets with coke, after which leaching can be performed with sulphuric acid. The leaching is performed with return sulphuric acid from electrolytic precipitation of chromium and thus contains ammonium sulphate, and from the chromium-iron sulphate solution, by means of series-crystallization a pure ammonium chromium sulphate can be produced which, upon electrolytic cracking, gives chromium cathodes and return sulphuric acid. The iron must be rejected as iron sulphate.

Several advantages are gained by the use of the present invention: that fine-grained chromite in the form of concentrate from enrichment of poor ore can be used as starting material, the reduction can be performed with coal, no liberation of chromium from the anode material in the neutral electrolyte appears, the anode residue can be directly leached with return sulphuric acid, the production of pure chromium salt for the electrolysis is facilitated and, finally, the iron content can be utilized as pure iron cathodes.

It may also be mentioned that chromium ores often contain platinum-group metals. These can also be recovered by application of the method according to the invention, in which case the process is preferably divided into two steps. A gentle reduction is effected in the first step and only some of the iron is reduced, whereupon this iron will take the platinum-grpoup metals with it in the form of metals, not as carbides. After electrolytic liberation of the iron, the platinum-group metals are obtained in an anode slam.

The invention can also be used in the recovery of pure molybdenum from waste material containing iron, and even tungsten and uranium can be recovered by means of the method according to the present invention.

We claim:
1. A method of separating iron and at least one ferro-alloy metal from fine-grained oxidic material comprising the steps of:
    (a) injecting said material into a furnace together with carbon powder and a reducing gas and supplying heat to the furnace by means of a plasma generator so as to bind at least a portion of the alloy metal as carbide;
    (b) removing said carbided ferro-alloy metal and said iron from the furnace as a melt;
    (c) solidifying and granulating said carbided ferro-alloy metal and iron and placing said granulated ferro-alloy metal and iron in an electrolytic cell as an anode in an electrolytic solution;
    (d) passing an electric current between the anode and a cathode in the electrolyte solution such that iron is liberated from the anode and iron is precipitated at the cathode, thereby causing substantially all of the iron at the anode to be liberated leaving a residue of carbided ferro-alloy metal at said anode; and
    (e) separately removing said residue at the anode and said iron at the cathode thereby separating said iron from said ferro-alloy metal.

2. A method according to claim 1 including the step of injecting nitrogen gas together with the carbon and reducing gas so as to bind at least a further portion of the alloy metal as nitrides, and thereby forming a mixture of carbides and nitrides of the alloy metals, said mixture then forming a part of said residue at the anode.

3. A method according to claim 1 or 2 including the steps of injecting the oxidic material and carbon into the furnace by blowing said material and carbon into a reaction zone in said furnace, continuously maintaining said furnace filled with coke and maintaining said reaction zone in said coke by means of the gases heated by the plasma generator, and in said reaction zone binding said alloy metal as carbide and removing said carbided alloy metal from the reaction zone as melt.

4. A method according to claim 1 or 2 wherein the oxidic material, the carbon powder and reducing gas are blown into the furnace under the surface of a slag bed, whereupon carbiding reactions take place in gas bubbles formed in said slag bed and carbided ferro-alloy metal is separated at the bottom of the slag bed.

5. A method according to claim 1 or 2 wherein the oxidic material, the carbon powder and the reducing gas are blown into the furnace under the surface of a melt of ferro-alloy metal, and the slag thereby formed is separated out from said melt.

6. A method according to claim 1 or 2 wherein the ferro-alloy metal is at least one metal selected from groups IVa, Va and VIa of the periodic system.

7. A method according to claim 1 or 2 wherein the ferro-alloy metal is at least one metal selected from the group consisting of titanium, vanadium, zirconium, niobium, tantalum, chromium, molybdenum, tungsten and uranium.

8. A method according to claim 1 or 2 including the additional step of treating the residue of carbided ferro-alloy metal recovered at the anode so as to obtain substantially pure such metal.

* * * * *